3,257,340
DISPERSION POLYMERISATION OF MONOMER IN PRESENCE OF ALKYL MERCAPTAN
Desmond Wilfrid John Osmond, Iver Heath, England, assignor to Imperial Chemical Industries Limited, Millbank, London, England, a corporation of Great Britain
No Drawing. Filed May 1, 1961, Ser. No. 106,501
Claims priority, application Great Britain, May 4, 1960, 15,830/60
8 Claims. (Cl. 260—4)

This is a continuation-in-part of earlier application Serial No. 848,923, filed October 27, 1959, now abandoned.

This invention relates to the manufacture of dispersions of synthetic polymer in organic liquid.

It has previously been found that stable dispersions of polar synthetic polymers can be provided in relatively non-polar organic liquid, the dispersion being stabilised by block or graft copolymer of which one constituent is compatible with the polymer and incorporated in the disperse polymer particles and another is solvated by the organic liquid. Incorporation of the block or graft copolymer in the disperse particles results in the stabilising solvated constituent being firmly and irreversibly attached to the particles by the primary chemical bonds of the block or graft copolymer. This is in contrast to the use of conventional stabilising agents in which the stabilising solvatable groups become indirectly attached to the disperse particles through groups which themselves are merely adsorbed onto the surface of the disperse particles by second order forces.

One method of making such dispersions is by co-precipitating the polymer and the block or graft copolymer in the organic liquid, the polymer and copolymer being formed in situ by polymerising monomer and copolymerisable solvated constituent in the organic liquid in which the resulting polymer is to be dispersed. Polymerisation of the mixture results in the formation of polymer and of a block or graft copolymer of the solvated constituent and part of the monomer, the polymer and copolymer being coprecipitated as they are formed to produce a stable dispersion in the organic liquid.

Where the block or graft copolymer is formed in situ by copolymerisation of a solvated constituent with part of the monomer the rate of formation of the block or graft copolymer should not be grossly out of balance with the rate of formation of the polymer with which it is being precipitated; if the grafting reaction is carried to excess it will result in cross-linking of the solvated constituent in the organic liquid causing thickening or even gelation of the whole continuous phase.

The danger of thickening or gelation is particularly great when attempting to prepare dispersions of high solids content, i.e. greater than 40%. This is unfortunate since it is the potentiality of being free-flowing liquids even at high solids content which renders our dispersions of particular value in coating compositions. For example, in a conventional lacquer-type coating composition based on a solution of a polymer such as polymethyl methacrylate, the polymer content cannot be much higher than 20% since the viscosity characteristics of the composition becomes such as to make application by spraying impossible. Clearly, a polymer dispersion which contains over 40% of polymer and is still a free-flowing liquid would form an excellent basis for a coating composition.

Whilst it is possible to use in the in situ process a solvated constituent which is of such reactivity that the production of block or graft copolymers proceeds substantially in pace with the production of the polymer to be stabilised, the selection of such a constituent places a further limitation on the choice of solvatable constituent. Further, where the dispersions are to be used in coating compositions they should, in addition to being free-flowing liquids, have the following characteristics:

(i) The molecular weight of the disperse polymer should be in the range 50,000–250,000, preferably between 90,000 and 150,000,
(ii) The disperse particles should be small in size, less than $1.0\mu$ average, and preferably not more than $0.5\mu$.

I have now found an alternative method of achieving the desirable balance between polymer and block or graft copolymer formation which results in a free-flowing dispersion and which at the same time makes it possible to adjust the characteristics of the polymer dispersion in accordance with user requirements.

According to the present invention a dispersion of polar synthetic polymer in relatively non-polar organic liquid is made by polymerising monomer in solution in the organic liquid in the presence of a solvated constituent which would tend to form a block or graft copolymer with the monomer in amounts in excess of that required to stabilise the disperse polymer, the formation of block or graft copolymer being retarded by the presence in the solution of an organic chain transfer agent or a retarder which can render free radicals in the solvated constituent or in the block or graft copolymer incapable of reacting with monomer.

In one embodiment of the invention the organic chain transfer agent or retarder is added part-way through the polymerisation process so as to allow in the initial stage an unretarded build-up of block or graft copolymer to a suitable level capable of producing a dispersion of fine particle size.

In processes in which it is desired to add monomer at intervals or continuously during the course of the polymerisation it is preferred to add organic chain transfer agent or retarder with the monomer, conveniently, mixed with it. Added in this way with the monomer, the transfer agent or retarder is effective in retarding the tendency to a higher rate of production of block or graft copolymer which is caused by the addition of monomer in this way. Further, where the organic transfer agent or retarder is used additionally to control the molecular weight of the polymer, this mode of addition allows narrow molecular weight distribution to be obtained.

If the organic chain transfer agent or retarder, hereinafter referred to as scavenger, is to retard the reaction of the solvated constituent or block or graft copolymer with monomer it will usually also be able to modify to some extent the polymerisation of the monomer itself, i.e. it can be used to reduce the molecular weight of the resulting polymer.

It will be appreciated that when scavenger is present during the polymerisation in the organic liquid it will in fact partition itself between the liquid and the disperse particles. The partition coefficient will depend on the polarity of the scavenger relative to the liquid and the polymer and by selecting scavenger of suitable polarity useful secondary advantages can be derived from this invention.

For example, when disperse particles of polymer have been formed monomer is adsorbed from the solution and polymerisation continues on the particle itself. Because random termination of the growing polymer chain is restricted under these conditions it is this polymerisation on the particle which leads to the formation of particularly high molecular weight polymer; the polymerisation which takes place in solution can proceed only to a limited extent due to the higher chance of random termination. In the case, say, of methyl methacrylate, solution polymerisation will generally yield polymer of a molecular weight of about 100,000. When precipitated in aliphatic hydrocarbon, polymerisation may take place on the disperse particle up to a molecular weight of 1,000,000 or more. Consequently, if a dispersion of low molecular weight or restricted molecular weight distribution is required this may be achieved in accordance with one embodiment of this invention by using a scavenger which partitions itself largely on the disperse particles of polymer. In this way further polymerisation on the particle can be reduced or eliminated so as to produce a dispersion of polymer of reduced molecular weight and of narrow molecular weight distribution, in the limit approaching molecular weight and distribution achieved in solution polymerisation. Such a scavenger will, of course, as a result of the partition, have less effect on polymerisation taking place in solution, i.e. on the reaction of monomer with solvatable constituent or block or graft copolymer, and consequently the relative proportion of stabiliser will be higher. This, in combination with the retardation of polymerisation on, and consequent growth of, the disperse particles, will lead to the possibility of finer dispersions, itself a further advantage in some applications, e.g. in coating compositions. However, care must be taken that the effect of the scavenger on solution polymerisation is not so low as to lead to a renewed danger of excessive thickening or gelation of the dispersion. Partition of the scavenger largely on the polymer particles may be achieved by using one of polarity nearer that of the polymer than that of the organic liquid.

On the other hand, if dispersions of high molecular weight are required the scavenger chosen should be of such a polarity that on partition it will for the most part remain in the organic liquid. Here, of course, it will be most effective in its primary function of preventing excessive thickening or gelation of the dispersion and will have only a small effect on polymerisation on the disperse particles. It will, of course, be borne in mind that if the scavenger is too effective and acts as a suppressor rather than a retarder, the dispersion will be of course particle size.

The invention is broadly applicable to the manufacture of dispersions of polar synthetic polymers as referred to generally above. The invention is particularly applicable to processes of preparing dispersions of acrylate polymers, by which we mean polymers and copolymers comprising acrylic or methacrylic acid or an ester, amide or nitrile of such an acid. Typical materials which are suitable as monomers in this invention include acrylonitrile, acrylates and methacrylates of aliphatic alcohols such as ethyl, octyl, lauryl and natural fat alcohols. The preferred monomers for use in the production of polymers for the preparation of coating compositions by this process are methyl methacrylate, β-ethoxy ethyl methacrylate, ethyl acrylate, acrylonitrile, methacrylic acid and acrylic acid, and amides of these acids. Combinations of the above monomers may be used and other typical materials which are suitable for use as comonomers include dimethyl itaconate, diethyl maleate and maleic anhydride.

These polymers are suitably prepared in relatively non-polar organic liquids such as aliphatic hydrocarbons, long chain alcohols, higher fatty ketones, and higher fatty esters and admixtures of these. Unsaturated polymeric hydrocarbons, e.g. natural rubber, preferably degraded, and liquid polybutadienes are suitable as the solvatable constituent.

Suitable scavengers for use in such processes include alkyl mercaptans, allyl compounds such as allyl alcohol, and terpene derivatives such as alloocimene and myrcene.

To obtain an acrylate dispersion of characteristics eminently suited to its use in coating compositions we prefer to use alkyl mercaptans in which the alkyl group contains from 4–9 carbon atoms. Higher alkyl mercaptans can be used where molecular weight control is not essential. Those containing more than 14 carbon atoms tend to be too non-polar for acrylate dispersions intended for use in coating compositions, their partition coefficient being such that control over molecular weight on the disperse particles cannot be achieved without having an excessive amount in solution in the organic liquid.

The free-flowing polymer dispersions made by the processes of the present invention may be used as the basis of coating compositions, plasticiser for the polymer and disperse pigment being incorporated as and how required by known methods.

The invention is illustrated by the following examples in which the parts are by weight:

*Example I*

A. The following ingredients were charged to a 3 litre glass reactor equipped with a heating and cooling jacket, stirrer, batch thermometer, sample line and reflux condenser:

| | Parts |
|---|---|
| Methyl methacrylate | 900 |
| White spirit | 450 |
| 60–80° C. petroleum ether | 630 |
| Degraded rubber (molecular weight 30,000) | 30 |
| Benzoyl peroxide | 1 |

This charge was heated to reflux temperature (approximately 80° C.) and held for 3 hours. Approximately 30 minutes after reaching reflux the reaction became strongly exothermic and cooling was required. After 3 hours conversion was over 95% and the batch was cooled to room temperature and discharged.

The product was an extremely viscous cream or weak gel. The overall average molecular weight was 2,400,000 as determined by viscosity measurements in ethylene dichloride.

B. Example A was repeated save that the amount of methyl methacrylate was increased to 1,200 parts, in an attempt to increase the solids of the final dispersion from 45% to 55%.

Approximately 40 minutes after reaching reflux and approximately 20 minutes after the reaction had become strongly exothermic, the batch thickened and within a few minutes set to a tough rubber gel.

C. Example B was repeated save that 0.3 part of the very white spirit-soluble tertiary dodecyl mercaptan was added to the initial charge. The reaction proceeded normally, showing the characteristic acceleration after about 30 minutes at reflux temperature. However, there was no sign of thickening and the final product of 53% solids obtained after reaction for 3 hours was a mobile, free-flowing liquid with a viscosity of about 1 or 2 poises. The average molecular weight of the polymer was 1,750,000, not significantly lower than that produced in Example A.

Comparison of Examples A, B and C illustrates the effectiveness of the mercaptan scavenger in preventing thickening and gelling.

A pigment paste was made by dispersing 30 parts of rutile titanium dioxide in 15 parts dibutyl phthalate and 30 parts mineral spirits using 1 part of a 60% solids solution of a rosin-modified long oil alkyd resin as a dispersing agent. To this paste were added 100 parts of the product of Example I(C) together with 10 parts dibutyl phthalate, 20 parts of low-boiling petroleum ether and 1 part of a 10% solution of liquid polysiloxane. The composition was thoroughly stirred, filtered and spray-applied to glass panels. The coated panels were allowed to stand for 5 minutes and then heated to 127° C. for half an hour. An extremely hard, tough, mar-resistant film which could be polished to a very high gloss, was obtained.

*Example II*

A. Example 1(B) was repeated save that 3.3 parts of the relatively polar isopropyl mercaptan were added to the parent charge together with a further 3 parts of benzoyl peroxide.

In this case the reaction proceeded smoothly without any marked increase in rate and with no tendency to thicken. Greater than 95% conversion was reached in 24 hours.

The final product was free-flowing liquid of viscosity of about 3 poises having in general an extremely fine particle size less than $0.3\mu$, but marred by containing a small proportion of extremely coarse particles larger than $1.0\mu$, which were removable by filtration.

The molecular weight of the polymer was 105,000.

B. Example II(A) was repeated save that the 3.3 parts of isopropyl mercaptan were not added to the initial charge. The batch was heated to reflux temperature and after approximately 15 minutes the first signs of an increased rate of reaction became apparent. Immediately the 3.3 parts of mercaptan were added. The rate of reaction steadied to that found in Example II(A) and the whole course of the subsequent reaction was as in Example II(A). The molecular weight of the polymer was about 105,000, and the final, fluid product was wholly of fine particle size, the small proportion of coarse particles found in Example II(A) having been eliminated. This illustrates the advantage of allowing an initial build-up of block or graft copolymer.

The product of Example II(B) was made up into a coating composition and applied as described in Example I. The film was again hard, tough, and mar-resistant but, because of the lower molecular weight of the polymer, was so glossy as to require no polishing.

*Example III*

Example I(B) was repeated save that 15 parts of the terpene derivative allo-ocimene were added to the initial charge together with a further 2 parts of benzoyl peroxide. The reaction proceeded smoothly with a small acceleration after about 30 minutes from reaching reflux. The final product was a creamy, free-flowing liquid of 54% solids of fine particle size and an average molecular weight of 222,000.

*Example IV*

Example I(B) was repeated save that 50 parts of allyl alcohol and 3 parts of benzoyl peroxide were added to the initial charge. The results obtained were substantially similar to those of Example III.

*Example V*

Examples I(C) and II(B) weer repeated save that the 630 parts of petroleum ether were replaced by white spirit. The reaction was not carried out under reflux but the temperature was maintained by suitable control of the heating and cooling jackets at 80° C. and a blanket of nitrogen used to exclude air. Apart from the practical difficulty of maintaining adequate temperature control during the strongly exothermic phase of the reaction, the reaction proceeded exactly as before and the final products were indistinguishable from those of the corresponding examples.

*Example VI*

Examples I(C) and II(B) were repeated save that in place of 1,200 parts of methyl methacrylate, a mixture of 740 parts methyl methacrylate, 60 parts methacrylic acid and 400 parts of β-ethoxy ethyl methacrylate were used. No attempt was made to allow for different effective rates of reaction and the whole of the mixture of monomers was present in the initial charge.

The results obtained were substantially as before. It was not possible to determine accurately the molecular weights of the copolymers, but reduced viscosities in 95:5 ethylene dichloride:ethanol were within ±20% of those for the corresponding examples.

*Example VII*

A. The following ingredients were charged to the apparatus of Example I.

| | Parts |
|---|---|
| Methyl methacrylate | 100 |
| White spirit | 450 |
| 60–80° C. petroleum ether | 630 |
| Synthetic polybutadiene (substantially 1–4 addition and of molecular weight 25,000 approximately) | 24 |
| Benzoyl peroxide | 5 |

This charge was heated to reflux temperature about 80° C., and 800 parts of methyl methacrylate were dripped down the reflux condenser to blend with the returning reflux stream. The feed rate was arranged such that the 800 parts were added over 3 hours.

However, when less than 200 parts had been added, the extremely fine particle size dispersion which had been formed set to a sticky, rubbery gel.

B. Example VII(A) was repeated save that:

(i) 2 parts of primary octyl mercaptan were added to the initial charge.
(ii) 8 parts of primary octyl mercaptan and 5 parts of benzoyl peroxide were dissolved in the feed of 800 parts of methyl methacrylate.

The reaction proceeded satisfactorily and a fluid, fine particle size, dispersion of 45% solids was readily achieved.

The molecular weight of the polymer was approximately 85,000.

Comparison of Examples VII(A) and (B) again illustrates the value of the scavenger in preventing gelation of the dispersion.

What I claim is:

1. In a process for producing a stable dispersion of a solid polar addition polymer in an inert, relatively non-polar organic liquid in which the polymer is insoluble which comprises polymerising at least one ethylenically unsaturated monomer which is polymerisable by addition polymerisation in said organic liquid in the presence of a catalyst for the polymerisation of said monomer and a copolymerisable polymeric solvated constituent which is soluble in said organic liquid and forms a member of the group consisting of block and graft copolymer with said monomer to form said stable dispersion of solid polymer in organic liquid; the improvement which comprises carrying out the polymerisation in the presence, in the solution, of an alkyl mercaptan in which the alkyl groups contain 4 to 9 carbon atoms.

2. A process as claimed in claim 1 in which the mercaptan is added after an initial stage of the polymerisation process.

3. A process as claimed in claim 1 in which monomer and mercaptan are added during the course of the polymerisation.

4. A process as claimed in claim 1 in which the polymer is a member of the group consisting of acrylic acid, methacrylic acid and the esters, amides and nitriles thereof.

5. A process as claimed in claim 4 in which the solvated constituent is degraded natural rubber.

6. A free-flowing polymer dispersion made by a process claimed in claim 1.

7. A coating composition comprising a polymer dispersion as claimed in claim 6, a plasticiser for the polymer and a dispersed pigment.

8. An article which has been coated with a composition as claimed in claim 7.

References Cited by the Examiner

UNITED STATES PATENTS

| | | | |
|---|---|---|---|
| 2,561,951 | 7/1951 | Roberts et al. | 260—33.6 |
| 2,656,297 | 10/1953 | Davis et al. | 260—33.6 |
| 2,744,085 | 5/1956 | Hubbard | 260—33.6 |
| 2,753,287 | 7/1956 | Thomson | 260—33.6 |
| 2,820,773 | 1/1958 | Childers et al. | 260—879 |
| 2,843,561 | 7/1958 | Ingley et al. | 260—33.6 |
| 2,888,442 | 5/1959 | Uraneck et al. | 260—33.6 |
| 2,946,702 | 7/1960 | Bach | 260—33.6 |
| 2,966,474 | 12/1960 | Jurgeleit | 260—33.6 |
| 3,095,388 | 6/1963 | Osmond et al. | 260—4 |

FOREIGN PATENTS 554,596  3/1958  Canada.

OTHER REFERENCES

Hayes: Jour. Polymer Science, vol. XI, No. 6, pp. 531–537, December 1953.

MURRAY TILLMAN, *Primary Examiner.*

LEON J. BERCOVITZ, WILLIAM H. SHORT,
*Examiners.*

J. W. SANNER, G. F. LESMES, *Assistant Examiners.*